United States Patent
Chu et al.

(10) Patent No.: US 12,461,292 B2
(45) Date of Patent: Nov. 4, 2025

(54) DISPLAY DEVICE

(71) Applicant: InnoLux Corporation, Miao-Li County (TW)

(72) Inventors: Wei-Ming Chu, Miao-Li County (TW); Yu-Chun Hsu, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/631,371

(22) Filed: Apr. 10, 2024

(65) Prior Publication Data

US 2024/0377566 A1 Nov. 14, 2024

Related U.S. Application Data

(60) Provisional application No. 63/501,256, filed on May 10, 2023.

(30) Foreign Application Priority Data

Jan. 26, 2024 (CN) .............................. 202410112013

(51) Int. Cl.
*G02B 5/28* (2006.01)
*G09G 3/20* (2006.01)

(52) U.S. Cl.
CPC ............... *G02B 5/285* (2013.01); *G09G 3/20* (2013.01); *G09G 2320/0626* (2013.01); *G09G 2320/0666* (2013.01); *G09G 2320/0673* (2013.01); *G09G 2360/144* (2013.01)

(58) Field of Classification Search
CPC . G02B 5/285; G02B 1/11; G09G 3/20; G09G 2320/0626; G09G 2320/0666; G09G 2320/0673; G09G 2360/144; G09F 9/301; G09F 9/33; G09F 9/335; G09F 9/35
See application file for complete search history.

(56) References Cited

U.S. PATENT DOCUMENTS 7,298,076 B2 * 11/2007 Ozolins ................ H05K 5/0017
220/2.1 R
7,554,624 B2 * 6/2009 Kusuda ................... G06F 3/045
349/58
8,033,706 B1 * 10/2011 Kelly ................... G02B 6/0043
362/617

(Continued)

FOREIGN PATENT DOCUMENTS

CN 115552172 A 12/2022
TW 201243454 A 11/2012

*Primary Examiner* — Benyam Ketema
(74) *Attorney, Agent, or Firm* — Muncy, Geissler, Olds & Lowe, P.C.

(57) ABSTRACT

A display device is used to be accommodated in an exterior unit having at least a first color, and has a hidden display mode and a normal display mode. The display device includes a display panel and an optical structure layer. The optical structure layer is disposed on the display panel and includes an anti-glare layer and an anti-reflection layer disposed on the anti-glare layer. The gloss difference between the optical structure layer and the exterior unit is smaller than 10 GU. When in the hidden display mode, the display device displays at least a second color, and the color difference between the second color and the first color is smaller than 3, and when in the normal display mode, the display panel displays an image information.

20 Claims, 6 Drawing Sheets

(56) References Cited

U.S. PATENT DOCUMENTS

| | | | |
|---|---|---|---|
| 8,427,820 B2* | 4/2013 | Kusuda | G06F 1/1698 |
| | | | 345/169 |
| 2010/0085643 A1* | 4/2010 | Lee | H04N 5/64 |
| | | | 361/679.01 |
| 2012/0105340 A1* | 5/2012 | Beom | G06F 3/0412 |
| | | | 345/173 |
| 2014/0213323 A1* | 7/2014 | Holenarsipur | G06F 1/169 |
| | | | 455/566 |
| 2018/0099565 A1* | 4/2018 | Sano | B60K 35/22 |
| 2019/0227378 A1* | 7/2019 | Watanabe | G02F 1/133533 |
| 2020/0012150 A1* | 1/2020 | Watanabe | G02F 1/137 |
| 2021/0193973 A1* | 6/2021 | Ham | G02F 1/133512 |
| 2021/0382736 A1* | 12/2021 | Sanders | G06F 3/165 |
| 2023/0164444 A1* | 5/2023 | Yang | H04N 23/55 |
| | | | 348/335 |
| 2023/0408730 A1* | 12/2023 | Hsu | G02B 1/11 |
| 2024/0027811 A1* | 1/2024 | Hsu | G02B 6/0036 |
| 2024/0272342 A1* | 8/2024 | Kim | G02B 5/3033 |

* cited by examiner

DISPLAY DEVICE

CROSS-REFERENCE TO RELATED APPLICATIONS

This application claims the benefit of filing date of U.S. Provisional Application Ser. No. 63/501,256 filed on May 10, 2023 under 35 USC § 119 (e) (1), and also claims the benefit of the Chinese Patent Application Serial Number 202410112013.1, filed on Jan. 26, 2024, the subject matters of which are incorporated herein by reference.

BACKGROUND

Field of the Disclosure

The present disclosure relates to a display device and, more specifically, to a display device provided with an anti-reflection layer and an anti-glare layer.

Description of Related Art

In certain application scenarios of the display device, the specular reflection light of the display device may reduce the visibility of the screen, making it difficult for users to read information. Although some display devices are equipped with anti-reflection coatings and anti-glare coatings, there is still a small amount of reflected light and glare that cannot be completely eliminated, resulting in that the display device cannot provide a viewing experience similar to that for paper-based materials.

Therefore, it is necessary to provide an improved display device to alleviate and/or obviate the above problems

SUMMARY

The present disclosure provides a display device, which is used to be accommodated in an exterior unit having at least a first color, and has a hidden display mode and a normal display mode. The display device includes a display panel and an optical structure layer. The optical structure layer is disposed on the display panel and includes an anti-glare layer and an anti-reflection layer disposed on the anti-glare layer. The gloss difference between the optical structure layer and the exterior unit is smaller than 10 gross units (GU). When in the hidden display mode, the display device displays at least a second color, and the color difference between the second color and the first color is smaller than 3, and when in the normal display mode, the display panel displays an image information.

Other novel features of the disclosure will become more apparent from the following detailed description when taken in conjunction with the accompanying drawings.

DETAILED DESCRIPTION OF EMBODIMENT

Figure 1A:
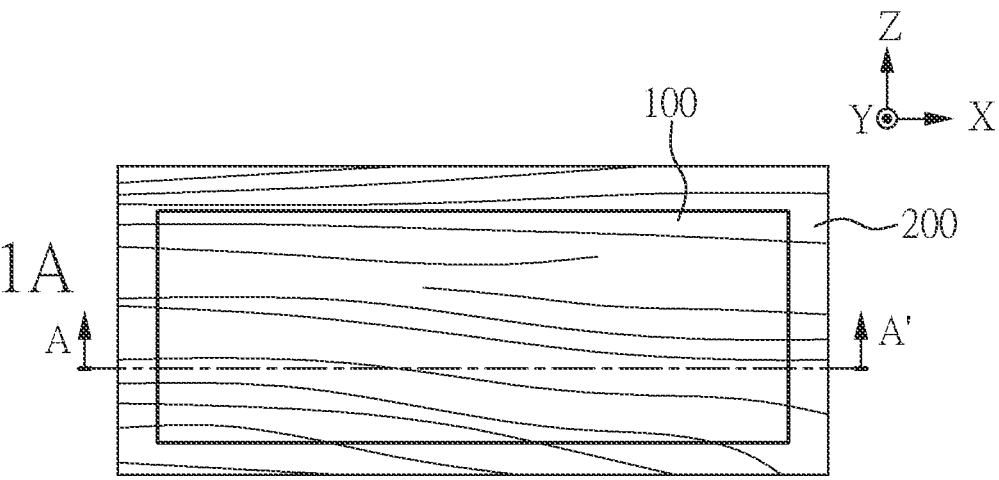
FIG. 1A shows a schematic diagram of a display device in a hidden display state according to an embodiment of the present disclosure.

The following provides different embodiments of the present disclosure. These embodiments are used to illustrate the technical content of the present disclosure, rather than to limit the claims of the present disclosure. A feature of one embodiment can be applied to other embodiments through suitable modification, substitution, combination, and separation.

It should be noted that in this specification, when a component is described as "comprising", "having", or "including" an element, it means that the component may include one or more elements, and the component may also include other elements, without implying that the component consists of only one of those elements, unless otherwise stated.

Moreover, in this specification, ordinal numbers such as "first" or "second" are only used to distinguish multiple elements with the same name, and do not mean that there is essentially a hierarchy, level, execution order, or manufacturing sequence, unless otherwise stated. The serial numbers of components in the specification may be different from those in the claim. For example, a "second" element in the specification may be a "first" element in the claim.

In the specification and claims, unless otherwise specified, the feature A "or" or "and/or" feature B means that feature A exists alone, feature B exists alone, or feature A and feature B exist at the same time. The feature A "and" feature B refers to the simultaneous existence of feature A and feature B.

In addition, in this specification, the terms "top", "upper", "bottom", "front", "back", or "middle", as well as the terms "above", "over", "on top", "under", "below" or "between"

are used to describe the relative position between multiple elements, and the described relative position may be interpreted to include their translation, rotation or reflection.

In addition, the positions mentioned in the specification and claims, such as "over", "on", "above", "under" or "below" may mean that one element is in direct contact with other elements, or may mean that one element is in indirect contact with other elements.

In addition, terms described in the specification and claims, such as "connected", mean that one element not only can be directly connected to other elements, but also can be indirectly connected to other elements. On the other hand, terms such as "electrically connected" and "coupled" described in the specification and claims mean that one component not only can be directly electrically connected to other components, but also can be indirectly electrically connected to other components.

In this disclosure, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "range is a first value to a second value" and "range is between a first value and a second value" mean that the range includes the first value, the second value and other values between the first value and the second value.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation.

Figure 1B:
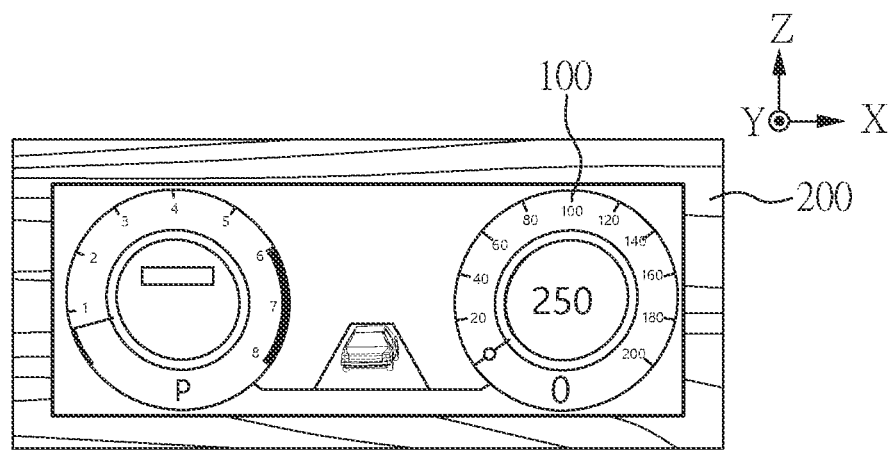
FIG. 1B shows a schematic diagram of a display device in a normal display state according to an embodiment of the present disclosure.
Figure 1C:
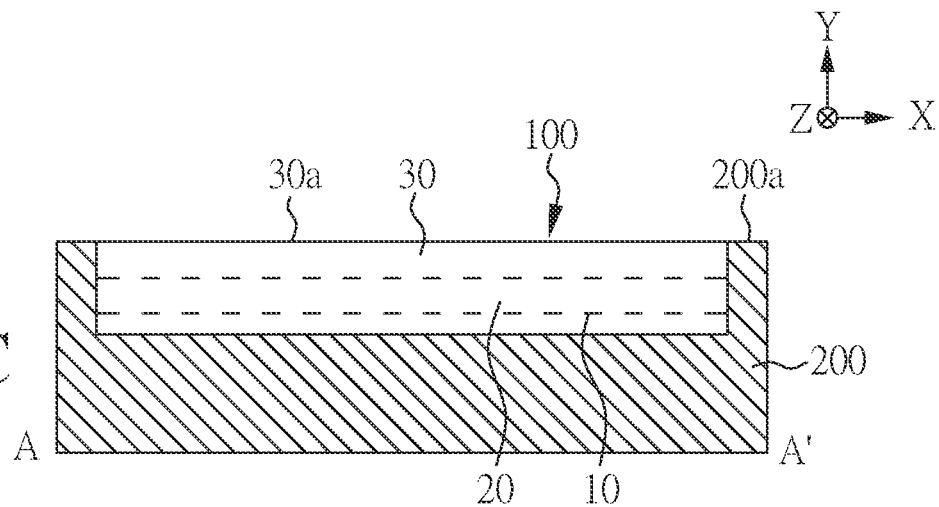
FIG. 1C shows a cross-sectional view of a display device according to an embodiment of the present disclosure.

Please refer to FIG. 1A to FIG. 1C. FIG. 1A shows a schematic diagram of the display device 100 in a hidden display state according to an embodiment of the present disclosure, FIG. 1B shows a schematic diagram of the display device 100 in a normal display state according to an embodiment of the present disclosure, and FIG. 1C shows a cross-sectional view of a display device according to an embodiment of the present disclosure, wherein FIG. 1C shows the perspective corresponding to the A-A' section line in FIG. 1A and FIG. 1B. The display device 100 of the present disclosure is used to be accommodated in an exterior unit 200, and the display device 100 has a hidden display state and a normal display state.

The display device 100 may include a display panel 20 and an optical structure layer 30, and may optionally include a backlight module 10, wherein in the Y direction (for example, the display direction of the display device 100), the display panel 20 is disposed on the backlight module 10, the optical structure layer 30 is disposed on the display panel 20. That is, when the display device 100 is accommodated in the exterior unit 200, the optical structure layer 30 may be located on the outside, and at least part of the surface of the optical structure layer 30 may be exposed on the exterior unit 200. The display panel 20 and the optical structure layer 30 may be regarded as a display module, but it is not limited thereto.

In one embodiment, the exterior unit 200 may be, for example, a decorative panel of a car interior, and the surface of the decorative panel has a texture. In this aspect, the display device 100 may be, for example, a dashboard of a car. As shown in FIG. 1A, when the display device 100 does not need to display information, the display device 100 may enter the hidden display state. At this moment, the display device 100 may display a picture that is substantially similar to the texture of the exterior unit 200, so that the display device 100 may be visually hidden in the decorative panel. As shown in FIG. 1B, when the display device 100 needs to display information, the display device 100 may display image information (such as information content of the dashboard). In another embodiment, the exterior unit 200 may be, for example, a wall, and the surface of the wall may have a texture. When the display device 100 does not need to display information, the display device 100 may enter the hidden display state. At this moment, the display device 100 may display a picture that is substantially similar to the texture of the exterior unit 200. Therefore, the display device 100 may be visually hidden on the wall. When the display device 100 needs to display information, the display device 100 may display image information. The aforementioned types of exterior unit 200 are only examples but not limitation.

In order to achieve the effect of the hidden display state, the exterior unit 200 may have at least one first color. In the hidden display state, the display panel 20 displays at least one second color, wherein the color difference between the second color and the first color is set to be smaller than 3, while the display panel 20 displays image information in the normal display state. To explain in more detail, in the hidden display state, the chromaticity may be measured at any position on the display panel 20 and at any position on the exterior unit 200 by using an instrument such as a spectrometer, and the color difference between the two measurement positions is set to smaller than 3. Therefore, in the hidden display state, the image displayed by the display panel 20 may be substantially similar to the texture of the exterior unit 200. The definition of "color difference" here may be, for example, the Euclidean distance in a device-independent color space.

In addition, the gloss difference between the optical structure layer 30 and the exterior unit 200 is set to smaller than 10 GU (gloss unit). To explain in more detail, in the hidden display state, the gloss may be measured at any position on the display panel 20 and at any position on the exterior unit 200 by using an instrument such as a gloss meter, and the gloss difference between the two measurement positions may be smaller than 10 GU. Therefore, in the hidden display state, the image displayed on the display panel 20 may substantially have gloss similar to the texture of the exterior unit 200, and thus may be visually more similar.

In addition, as shown in FIG. 1C, in one embodiment, the optical structure layer 30 may have a surface 30a, and the exterior unit 200 may have a surface 200a. The surface 30a of the optical structure layer 30 and the surface 200a of the exterior unit 200 may be substantially located on the same plane, whereby the effect of the hidden display state of the display device 100 may be more obvious, while it is not limited thereto.

Furthermore, in one embodiment, when the display device 100 has a backlight module 10, the backlight module 10 may be, for example, a local dimming backlight module, so the backlight module 10 may be used to provide different brightness for different areas of the display panel 20, so that the hidden display state of the display device 100 may be closer to the texture of the exterior unit 200, while it is not limited thereto.

Figure 2A:
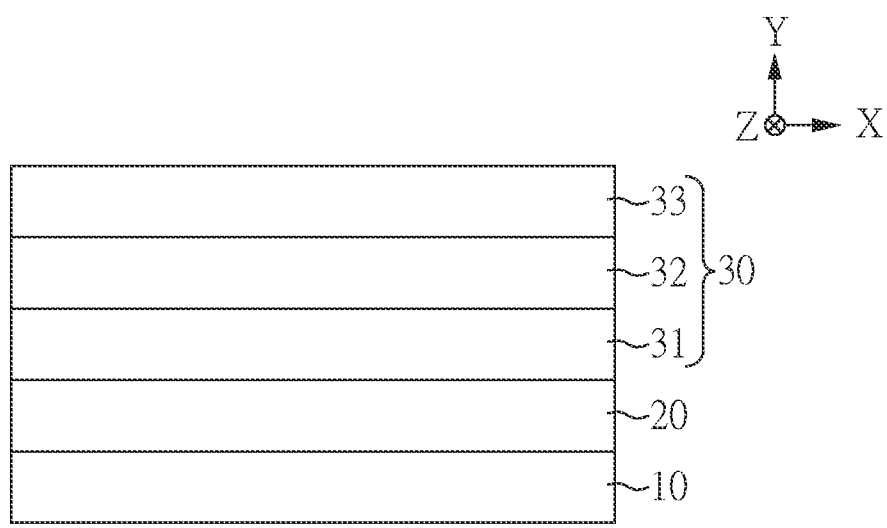
FIG. 2A shows a schematic structural diagram of a display device according to an embodiment of the present disclosure.

Next, the structure of the display device 100 will be described. FIG. 2A shows a schematic structural diagram of a display device 100 according to an embodiment of the present disclosure, and please refer to FIG. 1A to FIG. 1C at the same time.

As shown in FIG. 2A, the display device 100 includes a backlight module 10, a display panel 20 and an optical structure layer 30. The optical structure layer 30 includes a protective layer 31, an anti-glare layer 32 and an anti-reflection layer 33. In the Y direction, the protective layer 31 is provided on the display panel 20, and the anti-reflection layer 33 is provided on the anti-glare layer 32. In this embodiment, the protective layer 31 may be, for example, a glass cover, but it is not limited thereto. Through the appropriate combination of the display panel 20, the protective layer 31, the anti-glare layer 32 and the anti-reflection layer 33, the display device 100 may provide a paper display effect, or may significantly reduce reflected light and glare.

In one embodiment, the anti-glare layer 32 and the glass cover (protective layer 31) may form an anti-glare glass, wherein the gloss of the anti-glare glass may be between 10 GU and 50 GU, that is, 10 GU≤gloss of anti-glare glass≤50 GU, while it is not limited thereto. In one embodiment, the transmittance of the anti-glare glass may be greater than or equal to 90 percent (%), that is, 90%≤transmittance of anti-glare glass, while it is not limited thereto.

In one embodiment, the glass cover (protective layer 31), anti-glare layer 32 and anti-reflection layer 33 may form the optical structure layer 30, and its gloss may be between 4 GU and 35 GU, that is, 4 GU≤gloss of optical structure layer≤35 GU. In one embodiment, the gloss of the optical structure layer 30 may be between 4 GU and 30 GU, that is, 4 GU≤gloss of optical structure layer≤30 GU. In one embodiment, the gloss of the optical structure layer 30 may be between 4 GU and 20 GU, that is, 4 GU≤gloss of optical structure layer≤20 GU. However, the present disclosure is not limited thereto. In addition, in one embodiment, the transmittance of the optical structure layer 30 may be between 70% and 95%, that is, 70%≤transmittance of optical structure layer ≤95%. In addition, in one embodiment, the reflectivity of the optical structure layer 30 may be smaller than or equal to 6%, that is, 6%≤reflectivity of optical structure layer. In one embodiment, the reflectivity of the specular component included (SCI) reflection light of the optical structure layer 30 may be between 3% and 6%, that is, 3%≤SCI reflectivity of optical structure layer≤6%. In one embodiment, the reflectivity of the specular component included reflection light of the optical structure layer 30 may be between 4% and 6%, that is, 4%≤SCI reflectivity of the optical structure layer≤6%. However, the present disclosure is not limited thereto.

In one embodiment, the display panel 20 and the optical structure layer 30 may form a display module, and its gloss may be smaller than or equal to 10 GU, that is, 10 GU≥gloss of display module, such as 5 GU. In one embodiment, the SCI reflectivity of the display module may be smaller than or equal to 3%, that is, 3%≥SCI reflectivity of display module. In one embodiment, the reflectivity of the specular component excluded (SCE) reflection light may be greater than or equal to 0.6 times its SCI reflectivity, that is, the SCE reflectivity of display module≥0.6*SCI reflectivity of display module. As a result, the reflected light of the display device 100 may be reduced, thereby improving the visual quality.

In one embodiment, the display device 100 may be a bendable or flexible electronic device, and may be a non-self-luminous type or a self-luminous type. The display device 100 may include a light emitting unit, such as an organic light emitting diode (OLED), a sub-millimeter light emitting diode (mini LED), a micro light emitting diode (micro LED) or a quantum dot light emitting diode (quantum dot LED), but not limited thereto. The display technology of the display module may adopt liquid crystal display technology (liquid crystal, LCD), OLED display technology, mini LED display technology, micro LED display technology, cholesteric liquid crystal display (ChILCD) or electrophoretic display (EPD) technology and the like. According to the type of display technology, the display device 100 may or may not have the backlight module 10, while it is not limited thereto.

Figure 2B:
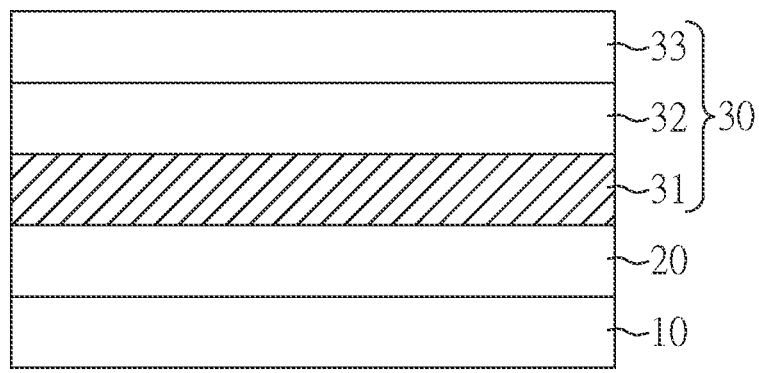
FIG. 2B shows a schematic structural diagram of a display device according to an embodiment of the present disclosure.

FIG. 2B shows a schematic structural diagram of a display device 100 according to an embodiment of the present disclosure, and please refer to FIG. 1 to FIG. 2A at the same time. The embodiment in FIG. 2B is generally applicable to the description of the embodiment in FIG. 2A, and thus the following description mainly focuses on the different features.

As shown in FIG. 2B, the protective layer 31 of the optical structure layer 30 may be, for example, a cover film, but it is not limited thereto.

In one embodiment, the anti-glare layer 32 and the cover film (protective layer 31) may form an anti-glare film, wherein the gloss of the anti-glare film may be between 10 GU and 50 GU, that is, 10 GU≤gloss of anti-glare film≤50 GU, while it is not limited thereto. In one embodiment, the transmittance of the anti-glare film may be greater than or equal to 90 percent (%), that is, 90%≤transmittance of anti-glare film, while it is not limited thereto.

In the embodiment of FIG. 2B, the gloss, transmittance, reflectivity, and reflectivity of the specular component included reflection light of the optical structure layer 30 may be applicable to the description of the embodiment of FIG. 2A. In addition, the display panel 20 and the optical structure layer 30 with the cover film (protective layer 31) may form a display module, and the gloss, SCI reflectivity or SCE reflectivity of the display module may be applicable to the description of the embodiment of FIG. 2A.

Figure 2C:
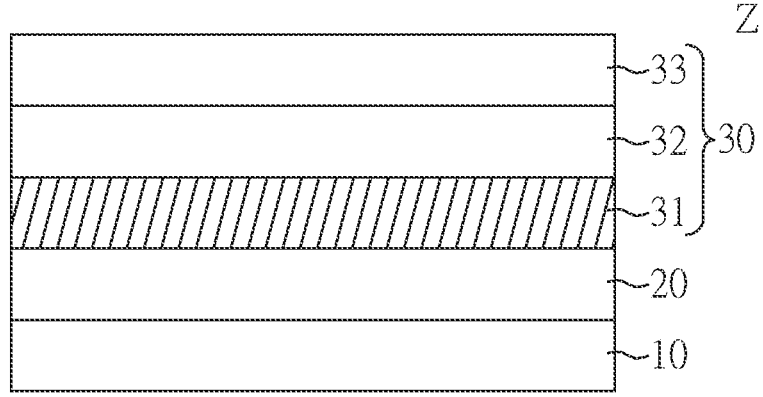
FIG. 2C shows a schematic structural diagram of a display device according to an embodiment of the present disclosure.

FIG. 2C shows a schematic structural diagram of a display device 100 according to an embodiment of the present disclosure, and please refer to FIG. 1A to FIG. 2B at the same time. The embodiment in FIG. 2C is generally applicable to the description of the embodiment in FIG. 2A, and thus the following description mainly focuses on the different features.

As shown in FIG. 2C, the protective layer 31 of the optical structure layer 30 may be, for example, a polarizer, but it is not limited thereto.

In one embodiment, the anti-glare layer 32 and the polarizer (protective layer 31) may form an anti-glare polarizer, wherein the gloss of the anti-glare polarizer may be between 10 GU and 50 GU, that is, 10 GU≤ gloss of anti-glare polarizer≤50 GU, but it is not limited thereto. In one embodiment, the transmittance of the anti-glare polarizer may be between 45% and 60%, that is, 45%≤transmittance of anti-glare polarizer ≤60%, while it is not limited thereto.

As a result, the structure of the optical structure layer 30 can be understood.

Figure 3A:
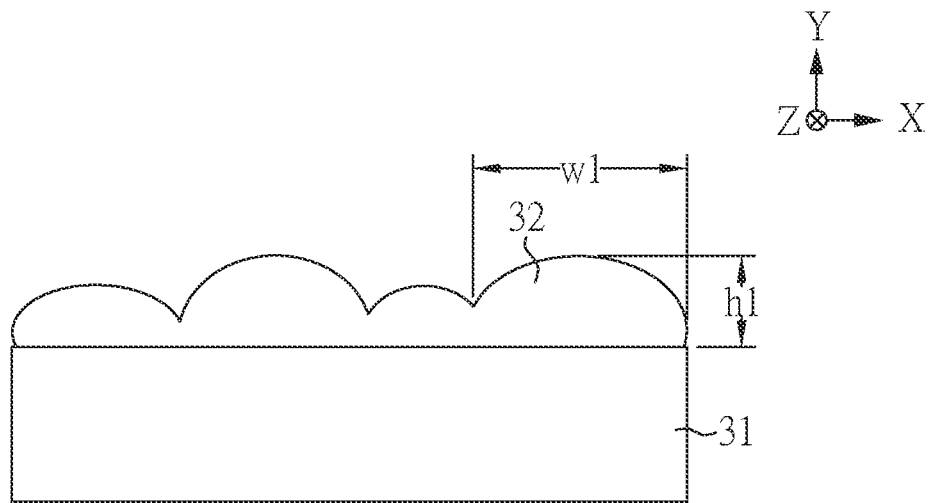
FIG. 3A shows a schematic structural diagram of the protective layer and anti-glare layer according to an embodiment of the present disclosure.
Figure 3B:
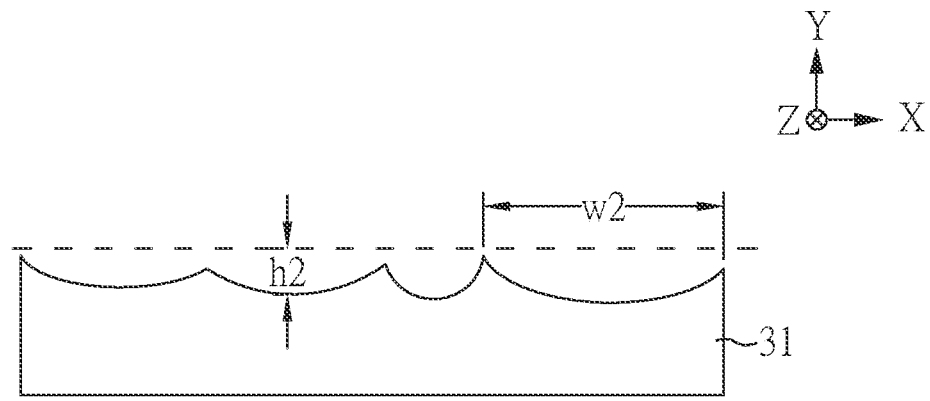
FIG. 3B shows a schematic structural diagram of the protective layer and anti-glare layer according to an embodiment of the present disclosure.

Next, the details of the protective layer 31 and the anti-glare layer 32 will be described. FIG. 3A and FIG. 3B are respectively schematic structural diagrams of the protective layer 31 and the anti-glare layer 32 according to an embodiment of the present disclosure, and please also refer to FIG. 1A to 2C. FIG. 3A and FIG. 3B may be used to illustrate the details of the anti-glare glass formed by the anti-glare layer 32 and the protective layer 31 in the form of a glass cover.

As shown in FIG. 3A, in one embodiment, the anti-glare layer 32 may be disposed on the glass cover (protective layer 31) by spraying. In one embodiment, "spraying" is, for example, to apply a specific solution for forming the anti-glare layer 32 to a surface of the glass cover (protective layer 31) so as to create a raised structure on the surface, and then to use high temperature to solidify the specific solution and the glass cover (protective layer 31), thereby forming anti-glare glass having an anti-glare layer 32. In one embodiment, the specific solution may be, for example, silicon dioxide ($SiO_2$), but it is not limited thereto.

In one embodiment, the anti-glare layer 32 formed by spraying may have a plurality of raised structures, wherein the width w1 of each raised structure (for example, the distance between peaks or between valleys of each raised structure) may be between 5 microns and 20 microns, that is, 5 um≤w1≤20 um, while it is not limited thereto. In one embodiment, the height h1 of each raised structure in the Y direction may be between 0.1 microns and 0.5 microns, that is, 0.1 um≤h1≤0.5 um, while it is not limited thereto. As a result, the anti-glare layer 32 may provide a good anti-glare effect.

As shown in FIG. 3B, in one embodiment, the surface of the glass cover (protective layer 31) may be roughened by etching, thereby producing an effect similar to the anti-glare layer 32. In one embodiment, "etching" is, for example, to use an acidic substance to corrode the film layer on the surface of the glass cover (protective layer 31) so as to create a concave structure on the film layer, thereby forming an effect (recess) similar to the anti-glare layer 32. Thus, it can be seen that the structure of the embodiment of FIG. 3B may achieve an effect similar to the anti-glare layer 32 by etching the protective layer 31, so that there is no need to have an actual anti-glare layer 32.

In one embodiment, the surface of the protective layer 31 may have a plurality of recessed structures after being roughened by etching, wherein the width of each recessed structure w2 (for example, the distance between peaks or between valleys of each recessed structure) may be between 5 microns and 20 microns, that is, 5 um≤w2≤20 um, while it is not limited thereto. In one embodiment, the depth h2 of each recessed structure in the Y direction may be between 0.1 microns and 0.5 microns, that is, 0.1 um≤h2≤0.5 um, while it is not limited thereto. As a result, the surface of the protective layer 31 may provide an anti-glare effect similar to that of the anti-glare layer 32.

Figure 4A:
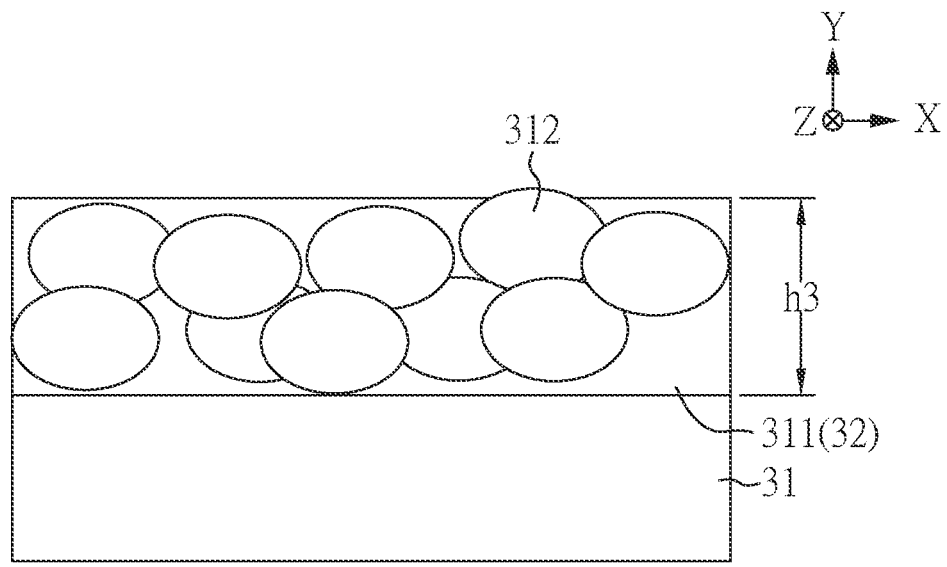
FIG. 4A shows a schematic structural diagram of a protective layer and an anti-glare layer according to another embodiment of the present disclosure.
Figure 4B:
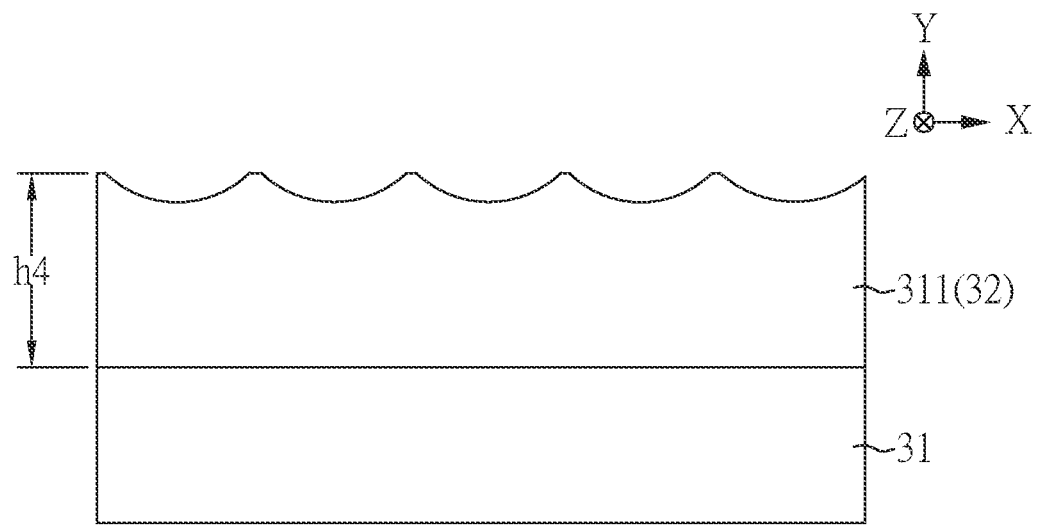
FIG. 4B shows a schematic structural diagram of a protective layer and an anti-glare layer according to another embodiment of the present disclosure.

FIG. 4A and FIG. 4B are respectively schematic structural diagrams of the protective layer 31 and the anti-glare layer 32 according to another embodiment of the present disclosure, and please refer to FIG. 1A to FIG. 2C at the same time. FIG. 4A and FIG. 4B may be used to illustrate the details of the anti-glare film formed by the cover film (protective layer 31) and the anti-glare layer 32.

As shown in FIG. 4A, in one embodiment, the cover film (protective layer 31) may have a hard coating layer 311, and the anti-glare layer 32 may be formed by mixing specific particulate matter 312 in the hard coating layer 311 to generate raised structures and recessed structures. In one embodiment, the hard coating layer 311 may have a maximum thickness h3 after generating the raised structure and the recessed structure. The maximum thickness h3 may be between 1 micron and 3 microns, that is, 1 um≤h3≤3 um, while it is not limited thereto. In one embodiment, the type of specific particulate matter 312 may include, for example, silicon dioxide particles, but it is not limited thereto.

As shown in FIG. 4B, in one embodiment, the cover film (protective layer 31) may have a hard coating layer 311, and the anti-glare layer 32 may be formed by applying nano-imprint technology on the hard coating layer 311 so as to form the recessed structure on the hard coating layer 311. In one embodiment, after generating the recessed structures, the hard coating layer 311 may have a maximum thickness h4. The maximum thickness h4 may be between 1 micron and 3 microns, that is, 1 um≤h4≤3 um, while it is not limited thereto.

Figure 5:
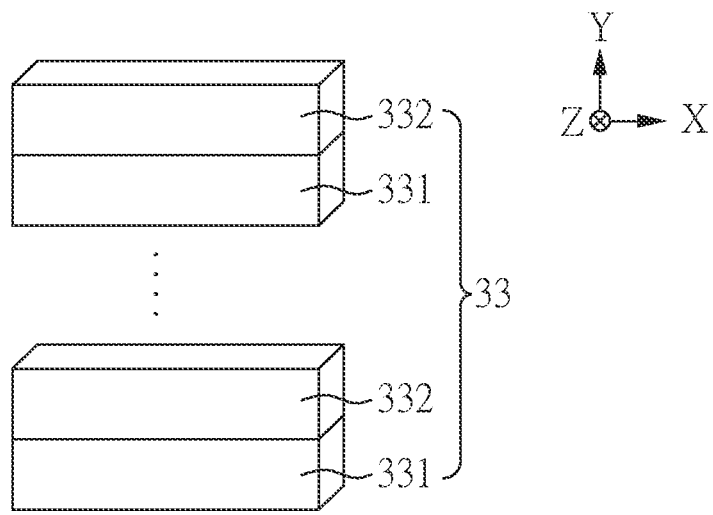
FIG. 5 shows a schematic structural diagram of an anti-reflection layer according to an embodiment of the present disclosure.

Next, the details of the anti-reflection layer 33 will be described. FIG. 5 shows a schematic structural diagram of the anti-reflection layer 33 according to an embodiment of the present disclosure, and please refer to FIG. 1A to FIG. 4B at the same time.

As shown in FIG. 5, in one embodiment, the anti-reflection layer 33 may be formed by using physical vapor deposition (PVD) technology to coat a plurality of film layers with different refractive indexes on the surface of the anti-glare layer 32. In one embodiment, the anti-reflection layer 33 may include a plurality of high refractive index sub-layers 331 and a plurality of low refractive index sub-layers 332, wherein the high refractive index sub-layers 331 and the low refractive index sub-layers 332 may be stacked alternately. For example, a low refractive index sub-layer 332 is disposed between at least two high refractive index sub-layers 331, or a high refractive index sub-layer 331 is disposed between at least two low refractive index sub-layers 332, while it is not limited thereto. In one embodiment, the high refractive index sub-layer 331 or the low refractive index sub-layer 332 may include metal oxide or dielectric material, while it is not limited thereto. In one embodiment, the outermost sub-layer of the anti-reflection layer 33 in the display direction is the low refractive index sub-layer 332, while it is not limited thereto. In one embodiment, the total number of high refractive index sub-layers 331 and low refractive index sub-layers 332 is at least four layers, while it is not limited thereto. Here, the refractive index of the high refractive index sub-layer 331 is higher than the refractive index of the low refractive index sub-layer 332, and the refractive index value of the high refractive index sub-layer 331 is between 1.9 and 2.4, that is, 1.9≤refractive index value of high refractive index sub-layer≤2.4. The refractive index value of the low refractive index sub-layer 332 is between 1.2 and 1.5, that is, 1.2≤refractive index value of low refractive index sub-layer≤1.5, while it is not limited thereto.

In one embodiment, the anti-reflection layer 33 may be a non-smoke AR layer. In one embodiment, the material of the high refractive index sub-layer 331 of the non-smoke AR layer may include niobium pentoxide ($Nb_2O_5$), but it is not limited thereto. In one embodiment, the material of the low refractive index sub-layer 332 of the non-smoke AR layer may include silicon dioxide ($SiO_2$), but it is not limited thereto. In one embodiment, the sub-layer configuration of the anti-reflection layer 33 in the form of a non-smoke AR layer may be presented in Table 1. It should be noted that the parameters and the number of sub-layers in Table 1 are only examples.

TABLE 1

| configuration of sub-layers of non-smoke AR layer | thickness of sub-layers of non-smoke AR layer (unit: nanometers (nm)) |
|---|---|
| low refractive index sub-layer 332 (material: silicon dioxide) | 86.7 |
| high refractive index sub-layer 331 (material: niobium pentoxide) | 110.5 |
| low refractive index sub-layer 332 (material: silicon dioxide) | 36.00 |
| high refractive index sub-layer 331 (material: niobium pentoxide) 11.7 | 11.7 |
| (below which) glass substrate (including anti-glare layer 32 and protective layer 31) | any configuration |

In another embodiment, the anti-reflection layer 33 may be a smoke AR layer. In one embodiment, the material of the high refractive index sub-layer 331 of the smoke AR layer may include a transparent conductive film (indium tin oxide, ITO), but it is not limited thereto. In one embodiment, the material of the low refractive index sub-layer 332 of the smoke AR layer may include silicon dioxide, but it is not limited thereto. In one embodiment, the high refractive index sub-layer 331 of the smoke AR layer has an absorption coefficient k, wherein the absorption coefficient k may be between 0.01 and 0.05, that is, 0.01≤k≤0.05, while it is not limited thereto. In addition, the low refractive index sub-layer 332 may substantially have no light absorption properties. In one embodiment, the configuration of the sub-layers of the anti-reflection layer 33 (smoke AR layer) may be shown in Table 2. It should be noted that the parameters and the number of sub-layers in Table 2 are only examples.

TABLE 2

| configuration of sub-layers of smoke AR layer | thickness of sub-layers of smoke AR layer (unit: nanometers (nm)) |
|---|---|
| low refractive index sub-layer 332 (material: silicon dioxide) | 84.2 |
| high refractive index sub-layer 331 (material: niobium pentoxide) | 72.09 |
| low refractive index sub-layer 332 (material: silicon dioxide) | 14.14 |
| high refractive index sub-layer 331 (material: niobium pentoxide) | 25.73 |
| low refractive index sub-layer 332 (material: silicon dioxide) | 134.55 |
| high refractive index sub-layer 331 (material: niobium pentoxide) | 15.07 |
| low refractive index sub-layer 332 (material: silicon dioxide) 27.56 | 27.56 |
| high refractive index sub-layer 331 (material: niobium pentoxide) | 259.91 |
| low refractive index sub-layer 332 (material: silicon dioxide) | 24.96 |
| high refractive index sub-layer 331 (material: niobium pentoxide) | 21.47 |
| (below which) glass substrate (including anti-glare layer 32 and protective layer 31) | any configuration |

In addition, in one embodiment, the reflectivity of the anti-reflection layer 33 may be between 3 percent and 6 percent, that is, 3%≤reflectivity of anti-reflection layer 33≤6%, while it is not limited thereto. In one embodiment, the overall thickness of the anti-reflection layer 33 in the Y direction may be between 200 nanometers and 700 nanometers, that is, 200 nm≤overall thickness of anti-reflection layer≤700 nm, while it is not limited thereto.

Figure 6:
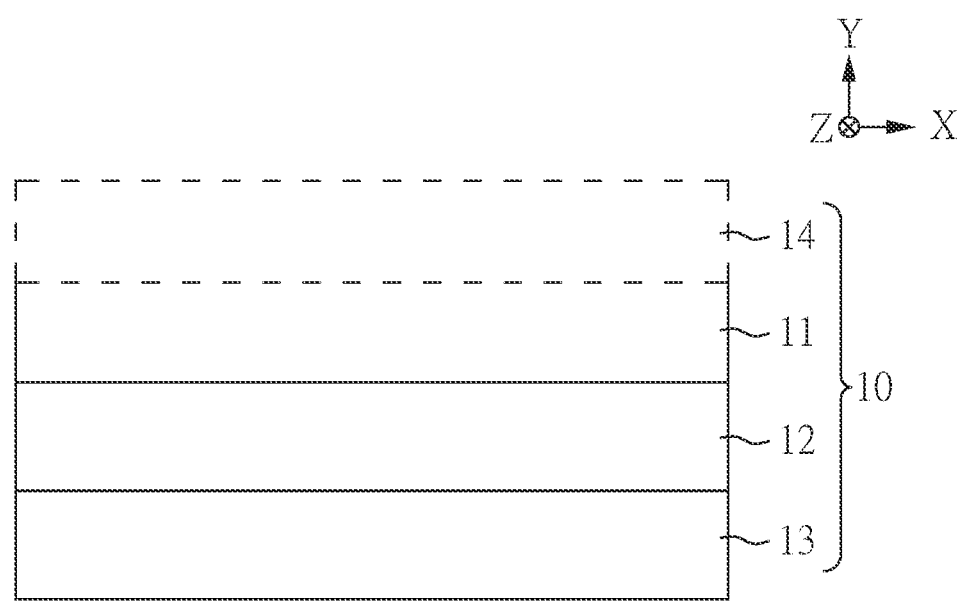
FIG. 6 shows a schematic structural diagram of a backlight module according to an embodiment of the present disclosure.

Next, the details of the backlight module 10 will be described. FIG. 6 is a schematic structural diagram of the backlight module 10 according to an embodiment of the present disclosure, and please refer to FIG. 1A to FIG. 5 at the same time.

As shown in FIG. 6, the backlight module 10 may include a first diffusion sheet 11, a second diffusion sheet 12 and a light guide plate 13, wherein, in the Y direction, the second diffusion sheet 12 may be disposed on the light guide plate 13, and the first diffusion sheet 11 may be disposed on the second diffusion sheet 12, that is, the first diffusion sheet 11 may be closer to the display panel 20 than the second diffusion sheet 12 and the light guide plate 13, while it is not limited thereto. In one embodiment, the number of diffusion sheets of the backlight module 10 is at least two, but it is not limited thereto. In one embodiment, a brightness enhancement film 14 may be disposed above the first diffusion sheet 11 in the Y direction, but it is not limited thereto. In one embodiment, the brightness enhancement film 14 may be, for example, a dual brightness enhancement film (DBEF), but it is not limited thereto.

Figure 7:
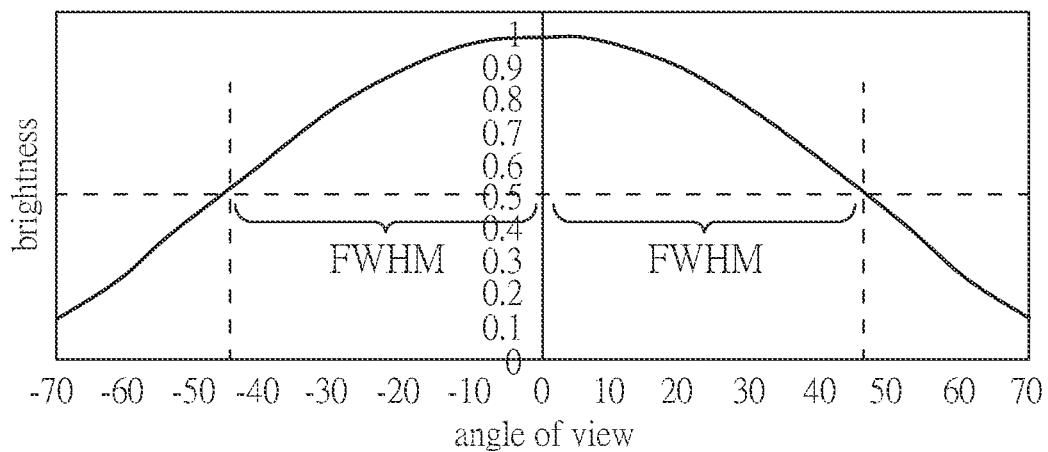
FIG. 7 shows a schematic diagram of the brightness versus angle-of-view distribution of the backlight module or display module according to an embodiment of the present disclosure.

Next, please refer to FIG. 7, which shows a schematic diagram of angle-of-view distribution of the backlight module 10 (for example, the display module is matched with the backlight module 10) or the display module (for example, the display module is a self-luminous display module without the backlight module 10), and also refer to FIG. 1 to FIG. 6 at the same time.

As shown in FIG. 7, the full width at half maximum (FWHM) of the brightness versus angle-of-view of the backlight module 10 or the display module may be greater than 40 degrees, that is, 40≤FWHM, for example, 45 degrees, while it is not limited thereto. Here, "full width at half maximum" refers to the angle difference between the angle of view with half the maximum brightness and the angle of view with zero degrees.

As a result, the detailed features of the detailed components of the display device 100 of the present disclosure can be understood.

Figure 8A:
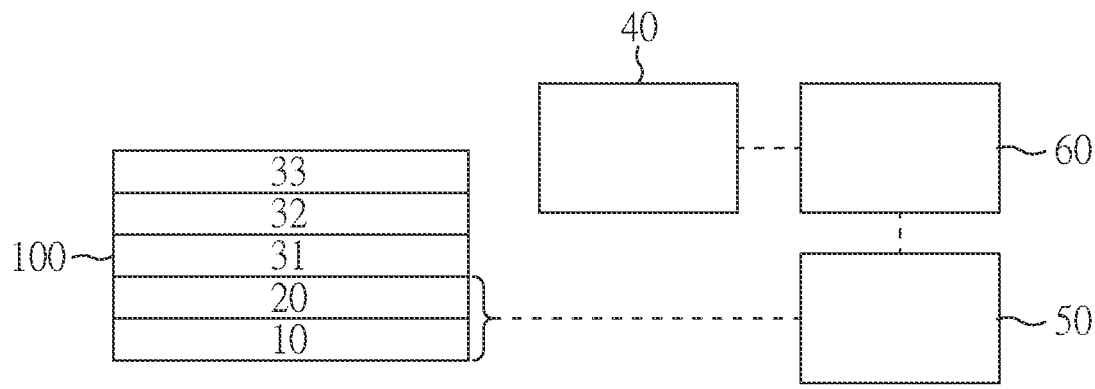
FIG. 8A shows a schematic diagram of a display device according to another embodiment of the present disclosure.

In addition, the display device 100 of the present application can also have different configurations and applications. FIG. 8A is a schematic diagram of a display device 100 according to another embodiment of the present disclosure, and please refer to FIG. 1A to FIG. 7 at the same time. Some features of FIG. 8A are applicable to the description of the embodiments of FIG. 1A to FIG. 7, and thus the following description mainly focuses on the differences.

As shown in FIG. 8A, the display device 100 may also include a light sensor 40 and a controller 50. In one embodiment, the light sensor 40 may be electrically connected to the controller 50, and the controller 50 may be electrically connected to the display panel 20 or the backlight module 10, but it is not limited thereto. In one embodiment, the light sensor 40 may be, for example, a blue light sensor, which is used to sense the intensity of blue light output by the display device 100, so that the display device 100 may execute an eye protection mode. Here, the blue light may be, for example, light with a wavelength of 415 nanometers to 455 nanometers (415 nm≤wavelength≤455 nm), while it is not limited thereto. In another embodiment, the display panel 20 is a self-luminous display panel so that the backlight module 10 may be omitted, and the controller 50 may be electrically connected to the display panel 20.

Furthermore, in the eye protection mode, the display device 100 may adjust the blue light intensity through software 60. For example, the software 60 may calculate an adjustment value based on the blue light intensity sensed by the light sensor 40, and transmit a control signal to the display device 100 through the controller 50 so as to adjust the blue light intensity output by the display device 100. In one embodiment, the adjustment value may be, for example, used to adjust the blue light intensity output by the display device 100 to be between 60 percent and 90 percent of the normal blue light intensity (60% of normal blue light intensity≤adjustment value≤90% of normal blue light intensity), while it is not limited thereto. In one embodiment, the control signal may be used to adjust the gamma curve of the display device 100, but it is not limited thereto. In one embodiment, the eye protection mode is suitable for the display device 100 to be used for educational purposes or applications in which users have to look at the screen for a long time, but it is not limited thereto.

Figure 8B:
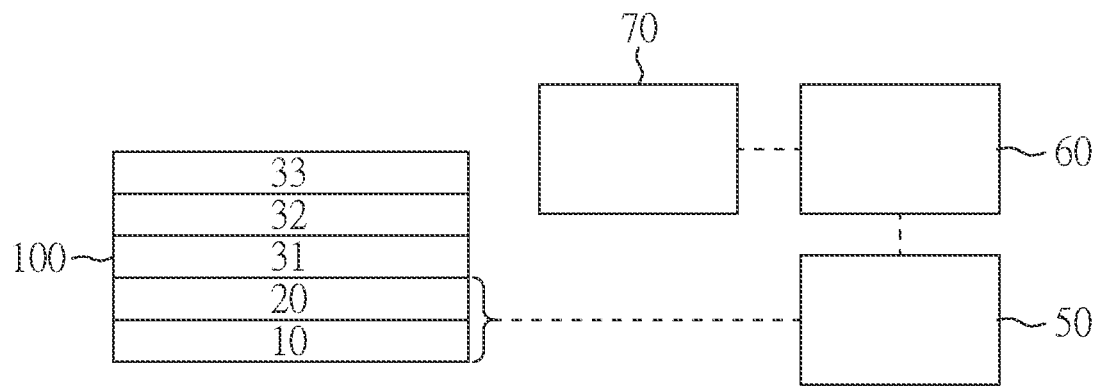
FIG. 8B shows a schematic diagram of a display device according to another embodiment of the present disclosure.

The display device 100 of the present disclosure may also have different configurations and applications. FIG. 8B is a schematic diagram of a display device 100 according to another embodiment of the present disclosure, and please refer to FIG. 1A to FIG. 7 at the same time. Some features of FIG. 8B are applicable to the description of the embodiments of FIG. 1A to FIG. 7, and thus the following description mainly focuses on the differences.

As shown in FIG. 8B, the display device 100 may further include a second light sensor 70 and a controller 50. In one embodiment, the second light sensor 70 may be electrically connected to the controller 50, and the controller 50 may be electrically connected to the display panel 20 or the backlight module 10, but it is not limited thereto. In another embodiment, the display panel 20 is a self-luminous display panel so that the backlight module 10 may be omitted, and the controller 50 may be electrically connected to the display panel 20.

In one embodiment, the second light sensor 70 may be used to sense the brightness and/or color temperature of the ambient light, and the display panel 20 may perform adjustment on brightness and/or color temperature based on the sensing results of the light sensor 40 so as to display image information. In one embodiment, the adjustment method may be implemented through the software 60. For example, the software 60 may calculate the adjustment value based on the sensing results, and the controller 50 may send a control signal to the display device 100. The control signal is, for example, used to adjust the gamma curve of the display panel 20 so as to further adjust the brightness or color temperature of the light displayed by the display panel 20, while it is not limited thereto.

In one embodiment, the software may be set so that the brightness and/or color temperature of the light displayed on the display panel 20 may be similar to the brightness and/or color temperature of the ambient light. In one embodiment, the software may be configured to make the brightness and/or color temperature of the light displayed on the display panel 20 complementary to the brightness and/or color temperature of the ambient light. Through the above two adjustment methods, the display device 100 is suitable for use in art exhibitions. For example, the display panel 20 may display image information of pictures or exhibits, and the brightness and/or color temperature of the display panel 20 may be adjusted according to the ambient light, so that the image information of the pictures or exhibits displayed on the display panel 20 may be closer to the effect of the actual pictures or exhibits under the ambient light, while it is not limited thereto.

From the above description, it can be seen that the surface of the display device of the present disclosure is equipped with the specially configured reflective layer and anti-glare layer, which may greatly eliminate specular reflection light, thereby improving the visual effect.

In one embodiment, it may determine whether a product in contention falls within the protection scope of the present disclosure at least by the presence or absence of components, component configurations, and/or operating modes of the product in contention, or by the algorithm of the product in contention, while it is not limited thereto.

The features of the various embodiments of the present disclosure may be mixed and matched arbitrarily as long as they do not violate the spirit of the disclosure or conflict with each other.

The aforementioned specific embodiments should be construed as merely illustrative, and not limiting the rest of the present disclosure in any way.

The invention claimed is:

1. A display device accommodated in an exterior unit having at least a first color, the display device having a hidden display state and a normal display state, and comprising:
   a display panel; and
   an optical structure layer disposed on the display panel and provided with an anti-glare layer and an anti-reflection layer disposed on the anti-glare layer, wherein a gloss difference between the optical structure layer and the exterior unit is smaller than 10 GU,
   wherein the display panel displays at least a second color in the hidden display state, and a color difference between the second color and the first color is smaller than 3, and wherein the display panel displays image information in the normal display state,
   wherein the display panel and the optical structure layer form a display module with a gloss of smaller than or equal to 10 GU, and
   wherein a reflectivity of a specular component excluded reflection light of the display module is greater than or equal to 0.6 times the reflectivity of the specular component included reflection light of the display module.

2. The display device as claimed in claim 1, wherein a surface of the optical structure layer and a surface of the exterior unit are substantially located on the same plane.

3. The display device as claimed in claim 1, wherein a gloss of the optical structure layer is between 4 GU and 35 GU, and a reflectivity of a specular component included reflection light of the optical structure layer is between 3% and 6%.

4. The display device as claimed in claim 1, wherein a gloss of the optical structure layer is between 4 GU and 30 GU.

5. The display device as claimed in claim 1, wherein a gloss of the optical structure layer is between 4 GU and 20 GU.

6. The display device as claimed in claim 1, wherein a transmittance of the optical structure layer is between 70% and 95%.

7. The display device as claimed in claim 1, wherein the anti-reflection layer includes a plurality of high refractive index sub-layers and a plurality of low refractive index sub-layers alternately stacked.

8. The display device of claim 1, further comprising a backlight module disposed below the display panel, wherein the backlight module is a local dimming backlight module.

9. The display device as claimed in claim 1, further comprising a light sensor for sensing a brightness of ambient light, wherein the display panel performs brightness adjustment based on sensing results of the light sensor so as to display the image information.

10. The display device as claimed in claim 1, further comprising a light sensor for sensing a color temperature of ambient light, wherein the display panel performs color temperature adjustment based on sensing results of the light sensor so as to display the image information.

11. The display device as claimed in claim 1, further comprising a blue light sensor for sensing a blue light intensity output by the display device, wherein the display panel adjusts the output blue light intensity based on sensing results of the blue light sensor.

12. The display device as claimed in claim 11, wherein the output blue light intensity is adjusted to be between 60% and 90% of a normal blue light intensity.

13. The display device as claimed in claim 1, wherein a reflectivity of a specular component included reflection light of the display module is smaller than or equal to 3%.

14. The display device as claimed in claim 1, wherein the optical structure layer further includes a protective layer disposed on the display panel, and the anti-glare layer is disposed on the protective layer.

15. The display device as claimed in claim 14, wherein the protective layer is a glass cover, and the anti-glare layer and the glass cover form an anti-glare glass with a gloss of 10 GU to 50 GU, and a transmittance of greater than or equal to 90%.

16. The display device as claimed in claim 14, wherein the protective layer is a cover film, and the anti-glare layer and the cover film form an anti-glare film with a gloss of 10 GU to 50 GU, and a transmittance of greater than or equal to 90%.

17. The display device as claimed in claim 14, wherein the protective layer is a polarizer, and the anti-glare layer and the polarizer form an anti-glare polarizer with a gloss of 10 GU to 50 GU, and a transmittance of 45% to 60%.

18. The display device as claimed in claim 1, wherein the anti-glare layer has a plurality of raised structures, each having a width of 5 microns to 20 microns, and a height of 0.1 microns to 0.5 microns.

19. A display device accommodated in an exterior unit having at least a first color, the display device having a hidden display state and a normal display state, and comprising:
    a display panel; and
    an optical structure layer disposed on the display panel and provided with an anti-glare layer and an anti-reflection layer disposed on the anti-glare layer, wherein a gloss difference between the optical structure layer and the exterior unit is smaller than 10 GU,
    wherein the display panel displays at least a second color in the hidden display state, and a color difference between the second color and the first color is smaller than 3, and wherein the display panel displays image information in the normal display state;
    wherein the display panel and the optical structure layer form a display module with a gloss of smaller than or equal to 10 GU;
    wherein a reflectivity of a specular component included reflection light of the display module is smaller than or equal to 3%.

20. A display device accommodated in an exterior unit having at least a first color, the display device having a hidden display state and a normal display state, and comprising:
    a display panel; and
    an optical structure layer disposed on the display panel and provided with an anti-glare layer and an anti-reflection layer disposed on the anti-glare layer, wherein a gloss difference between the optical structure layer and the exterior unit is smaller than 10 GU,
    wherein the display panel displays at least a second color in the hidden display state, and a color difference between the second color and the first color is smaller than 3, and wherein the display panel displays image information in the normal display state;
    wherein the optical structure layer further includes a protective layer disposed on the display panel, and the anti-glare layer is disposed on the protective layer;
    wherein the protective layer is a polarizer, and the anti-glare layer and the polarizer form an anti-glare polarizer with a gloss of 10 GU to 50 GU, and a transmittance of 45% to 60%.

\* \* \* \* \*